(12) United States Patent
Mathon et al.

(10) Patent No.: US 10,759,122 B2
(45) Date of Patent: Sep. 1, 2020

(54) METHOD AND TOOLING FOR SHAPING A FAN CASING

(71) Applicant: SAFRAN AIRCRAFT ENGINES, Paris (FR)

(72) Inventors: Richard Mathon, Brunoy (FR); Dominique Michel Serge Magnaudeix, Evry-Gregy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 183 days.

(21) Appl. No.: 15/841,987

(22) Filed: Dec. 14, 2017

(65) Prior Publication Data
US 2018/0169972 A1    Jun. 21, 2018

(30) Foreign Application Priority Data

Dec. 15, 2016 (FR) .................................... 16 62542

(51) Int. Cl.
*B29C 70/44* (2006.01)
*B29C 70/54* (2006.01)
(Continued)

(52) U.S. Cl.
CPC .......... *B29C 70/446* (2013.01); *B29C 33/505* (2013.01); *B29C 49/44* (2013.01);
(Continued)

(58) Field of Classification Search
CPC ... B29C 70/446; B29C 70/545; B29C 33/505; B29C 53/84; B29C 53/82; B29C 53/20;
(Continued)

(56) References Cited

U.S. PATENT DOCUMENTS

| 8,966,754 B2 * | 3/2015 | Xie | ........................ | F01D 21/045 |
| | | | | 29/889.2 |
| 2009/0155065 A1 * | 6/2009 | Xie | ........................ | F01D 11/122 |
| | | | | 415/200 |

(Continued)

FOREIGN PATENT DOCUMENTS

| EP | 1 471 212 A1 | 10/2004 |
| EP | 2 450 119 A1 | 5/2012 |

(Continued)

OTHER PUBLICATIONS

Search Report as issued in French Patent Application No. 1662542, dated Aug. 1, 2017.

*Primary Examiner* — Galen H Hauth
(74) *Attorney, Agent, or Firm* — Pillsbury Winthrop Shaw Pittman LLP

(57) ABSTRACT

A method of shaping the profile of a fan casing having an inside surface, the method including placing the casing around a surface of revolution of a drum of shaping tooling; interposing at least one bladder that is inflatable under the action of a fluid under pressure between a portion of the inside surface of the casing and the drum, the bladder extending over all or part of the surface of revolution of the drum; stoving the assembly including the casing, the tooling, and the at least one bladder at a predetermined temperature; and during the stoving, applying isostatic pressure via the at least one bladder so as to impart a cylindrical profile to the portion of the inside surface of the casing facing the at least one bladder.

10 Claims, 4 Drawing Sheets

(51) Int. Cl.
- B29C 33/50 (2006.01)
- B29D 99/00 (2010.01)
- F01D 25/24 (2006.01)
- B29C 53/20 (2006.01)
- B29C 53/82 (2006.01)
- B29C 49/44 (2006.01)
- B29C 53/84 (2006.01)
- B29L 31/00 (2006.01)

(52) U.S. Cl.
CPC .............. *B29C 53/20* (2013.01); *B29C 53/82* (2013.01); *B29C 53/84* (2013.01); *B29C 70/545* (2013.01); *B29D 99/006* (2013.01); *F01D 25/24* (2013.01); *B29L 2031/7504* (2013.01); *F05D 2230/42* (2013.01); *F05D 2240/14* (2013.01); *F05D 2300/44* (2013.01); *F05D 2300/603* (2013.01)

(58) Field of Classification Search
CPC ....... B29C 49/44; F01D 25/24; B29D 99/006; F05D 2300/44; F05D 2300/603; F05D 2300/42; F05D 2240/14; B29L 2031/7504
See application file for complete search history.

(56) References Cited

U.S. PATENT DOCUMENTS

| 2015/0266213 | A1* | 9/2015 | Vermilyea ............. B29C 43/027 264/570 |
| 2016/0354968 | A1* | 12/2016 | Zamora Rodriguez ..................... B29C 70/443 |

FOREIGN PATENT DOCUMENTS

| FR | 2 985 681 A1 | 7/2013 |
| FR | 2 993 490 A1 | 1/2014 |

* cited by examiner

METHOD AND TOOLING FOR SHAPING A FAN CASING

CROSS-REFERENCE TO RELATED APPLICATIONS

This application claims priority to French Patent Application No. 1662542, filed Dec. 15, 2016, the entire content of which is incorporated herein by reference in its entirety.

FIELD

The invention relates to a method of shaping a fan casing and to tooling for shaping the casing.

BACKGROUND

Among existing injection molding methods, a particularly well-known method is the resin transfer molding (RTM) method in which a mold comprises two half-shells that confine a mold cavity when they are placed one against the other. A fiber preform is inserted in the cavity between the two half-shells, and then resin is injected therein. The resin is polymerized while keeping the two half-shells closed. Depending on the desired production rate, polymerization may be performed at ambient temperature or by heating. Such a method can be used to make bodies of revolution, e.g. for fabricating fan casings of gas turbine engines for aviation.

The use of such a method is particularly beneficial since it enables parts to be made that present overall weight that is smaller than the weight of the same parts when they are made out of metal material, while still presenting mechanical strength that is at least equivalent if not greater.

On leaving the mold, i.e. on extraction of the fabricated part, deformation is commonly observed relative to the theoretical nominal shape. Thus, by way of example, for a body of revolution, such as a fan casing, a defect might be observed relative to the theoretical circular shape, which defect appears in the form of the part being ovalized on being extracted from the mold.

Such defects can be explained in particular by the fact that residual stresses act on the part during fabrication in the mold (e.g.: polymerization gradient, winding tension for a composite material part), which residual stresses are released when the part is extracted from the mold, thereby leading to deformation of the extracted part.

To counter that drawback, it is known to use at least one mold having a mold cavity of shape that does not correspond to the nominal shape of the part that is to be fabricated, but to a shape that takes account of the deformation, such that the part that is finally obtained on extraction from the mold has the nominal shape for the part. Beneficially, such a method makes it possible to counter the ovalization of a body of revolution on leaving the mold.

Nevertheless, when fabricating a fan casing, the ovalization observed therein does not arise solely while it is being extracted from the mold. Specifically, fabricating the casing subsequently involves various successive operations such as machining operations (e.g. trimming, drilling) and adhesive bonding (e.g. acoustic panels, fire protection panels). Machining operations lead to physical stresses being released that can encourage deformations of the casing. Adhesive-bonding operations are commonly performed in stoves. Such operations involve steps of raising the temperature of the casing and of putting it under pressure, followed by a step of cooling it. Together, those steps also lead to stresses appearing that act to ovalize the casing. Various ovalizations of the casing can thus appear throughout its fabrication process, and they tend to accumulate.

The existing state of the art thus appears to be insufficient for countering ovalization of the fan casing during its fabrication, given that the appearance of this ovalization does not occur solely while the casing is being extracted from its mold cavity, but also during steps of machining or of adhesive bonding.

SUMMARY

An aspect of the present invention is to remedy the above-mentioned drawbacks.

To this end, an aspect of the invention provides a method of shaping the profile of a fan casing having an inside surface, the method comprising the following steps:
  placing the inside surface of the fan casing around a surface of revolution of a drum of shaping tooling;
  interposing at least one bladder that is inflatable under the action of a fluid under pressure between a portion of the inside surface of the casing and the drum of the tooling, the bladder extending over all or part of the surface of revolution of the drum;
  stoving the assembly comprising the casing, the tooling, and the at least one bladder at a predetermined temperature; and
  during the stoving, applying isostatic pressure via the at least one bladder so as to impart a cylindrical profile to the portion of the inside surface of the casing facing the at least one bladder.

This method is particularly beneficial in that it can be performed at any time in the life cycle of the fan casing, either while it is being fabricated or while it is being subjected subsequently to repair. By way of example, it enables the ovalization of one or more predetermined zones of the fan casing to be corrected during a step of fabricating or of repairing the casing, e.g. during a step of adhesively bonding an external element that requires the casing to be stoved. The time required for fabricating or repairing the fan casing is thus shortened. Furthermore, the parts that are produced present shapes that are closer to the theoretical shapes than do parts made in the usual way. Such a method is also more robust since it gives better repeatability for the quality of the parts.

In another aspect, in this method the casing comprises a band extending axially between two flanges, the band having an intermediate zone situated at a distance from the flanges and two lateral zones on either side of the intermediate zone, the flanges extending radially from the lateral zones, the intermediate zone forming a retention zone of the casing, the isostatic pressure being applied in a bladder placed facing an inside surface of the retention zone.

In another aspect, in this method, the isostatic pressure is applied in at least one bladder arranged facing an inside surface of one of the lateral zones of the band.

In another aspect, in this method, the stoving step corresponds to a step of adhesively bonding an external element onto the fan casing.

In another aspect, in this method, the stoving step is performed while repairing the fan casing.

Another aspect of the invention also proposes tooling for shaping the profile of a fan casing having an inside surface, the tooling comprising a drum presenting a surface of revolution and at least one bladder that is inflatable under the action of a fluid under pressure and extending over all or part of the surface of revolution of the drum, the bladder being arranged so as to face a portion of the inside surface of the fan casing when it is put into place around the surface of revolution, the at least one bladder being connected to an adjustment system for adjusting a fluid under pressure and configured to use the fluid under pressure to control the inflation of the bladder so as to impart a cylindrical profile to the portion of the inside surface of the fan casing when it is in place around the surface of revolution.

In another aspect, in this tooling, the drum comprises a first rim, a second rim, and a third rim arranged between the first and second rims, and the at least one bladder is arranged on an outside surface of the third rim so as to face an inside surface of a retention zone of the casing when the casing is in place around the surface of revolution.

In another aspect, in this tooling, the at least one bladder is arranged on an outside surface of the first rim so as to face an inside surface of a first lateral zone of the band when the casing is in place around the surface of revolution.

In another aspect, in this tooling, the at least one bladder is arranged on an outside surface of the second rim so as to face an inside surface of a second lateral zone of the band when the casing is in place around the surface of revolution.

In another aspect, for this tooling, the adjustment system for adjusting a fluid under pressure are integrated in the tooling.

An aspect of the invention also provides a stove including shaping tooling made as described above.

In another aspect, for this stove, the adjustment system for adjusting a fluid under pressure are integrated in the stove.

BRIEF DESCRIPTION OF THE DRAWINGS

Other characteristics and benefits of the invention appear from the following description of particular embodiments of the invention given as non-limiting examples and with reference to the accompanying drawings, in which.

DETAILED DESCRIPTION

A gas turbine engine generally comprises, from upstream to downstream in the flow direction of the gas: a fan; one or more compressor stages, e.g. a low pressure compressor and a high pressure compressor; a combustion chamber; one or more turbine stages, e.g. a high pressure turbine and a low pressure turbine; and a gas exhaust nozzle.

The engine is housed inside a casing having a plurality of portions corresponding to the different elements of the engine. Thus, by way of example, the fan is surrounded by a fan casing, which is connected upstream to an air inlet sleeve and downstream to an annular shroud of an intermediate casing.

Figure 1:
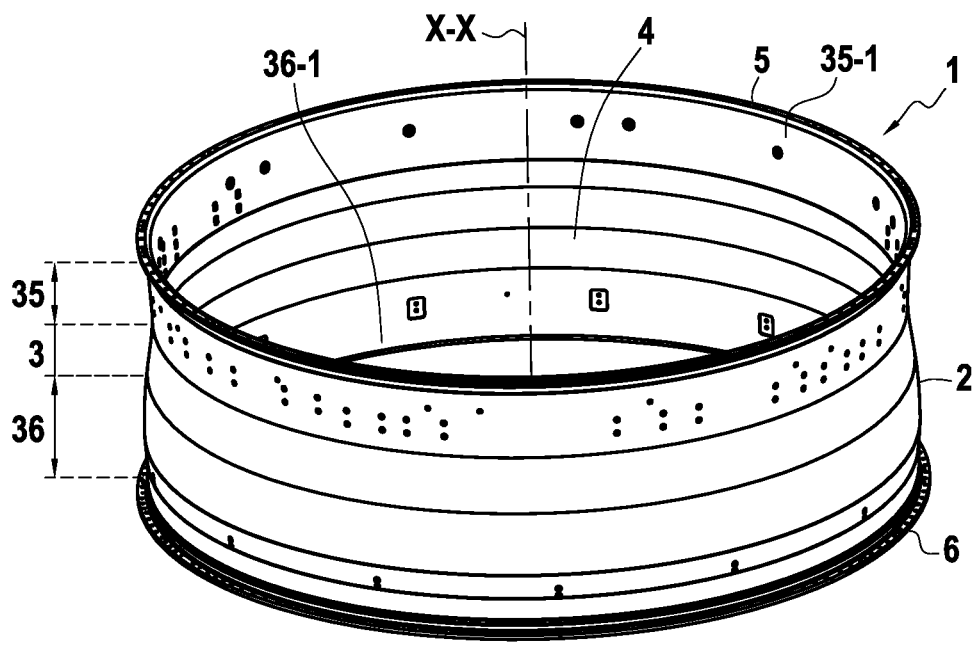
FIG. 1 is a perspective view of a fan casing.

FIG. 1 shows a conventional fan casing 1 for a gas turbine aeroengine. The casing 1 may be made out of a composite material, as described by way of example below.

For example, the casing 1 is made of composite material obtained by forming fiber reinforcement (e.g. out of carbon, glass, aramid, or ceramic fibers) and densifying the reinforcement with a matrix (e.g. a polymer matrix of epoxy, bismaleimide, or polyimide type). The reinforcement is shaped by winding onto a mandrel superposed layers of a fiber texture that is obtained by three-dimensional weaving with varying thickness.

In the example shown, the casing 1 is made using a resin transfer molding (RTM) method. Thus, the shape of the casing 1 that is obtained results from extracting the casing from a mold cavity. By way of example, the mandrel may act as a support for the mold cavity while a countermold is used for closing the cavity.

The casing 1 comprises a substantially cylindrical band 2 centered about an axis X-X and presenting a main direction that extends along that axis. The band 2 of the casing 1 may be of varying thickness. In particular, the band 2 may include an intermediate zone 3 of greater thickness between end portions that are connected progressively thereto. The intermediate zone 3 extends on both sides of the location of the fan, from upstream to downstream, so as to form a retention zone capable of retaining debris, particles, or objects ingested on entering the engine, or coming from damage to blades of the fan, and projected radially as a result of the fan rotating, so as to ensure that they do not pass through the casing 1 and damage other portions of the aircraft.

The intermediate zone 3 is situated at a distance from flanges 5 and 6 that extend radially from two lateral zones 35 and 36 situated on respective sides of the intermediate zone 3.

The flanges 5 and 6 enable the casing 1 to be mounted and connected to other parts. By way of example, a first flange, referred to as the "upstream" flange 5, is used for fastening an air inlet sleeve, while a second flange, referred to as the "downstream" flange 6, serves to connect the fan casing 1 to an intermediate casing by means of fastener members (e.g. nuts and bolts).

The upstream flange 5 and the downstream flange 6 are ideally of annular shape, and they extend radially relative to the axis X-X of the fan casing 1.

During its fabrication process, the casing 1 may subsequently be drilled in order to enable various elements to be assembled therewith, e.g. fastening acoustic panels or protection panels for forming a fire barrier.

As shown in FIG. 1, the fan casing 1 presents a shape that is ideal relative to an expected shape, in particular because of the substantially cylindrical shape of its band 2 and the annular shapes of its flanges 5 and 6.

In practice, it is commonly observed that the casing 1 is ovalized on leaving the mold. Such ovalization may subsequently become worse during the various fabrication or maintenance operations performed on the casing 1, in particular machining operations (e.g.: trimming, drilling) or adhesive-bonding operations (e.g.: acoustic panels, fire protection panels). This ovalization may be observed equally well for the flanges 5, 6, the lateral zones 35, 36, and for the intermediate zone 3 forming the retention zone of the casing 1. Such ovalization is found to be particularly problematic both for fastening the flanges 5, 6 and for allowing rotation of the fan blades, which are commonly mounted facing an inside surface 4 of the retention zone.

In order to counter these deformations, an embodiment of shaping tooling 100 for countering ovalization of predetermined zones of the casing 1 is shown in FIGS. 2 to 7.

Figure 3:
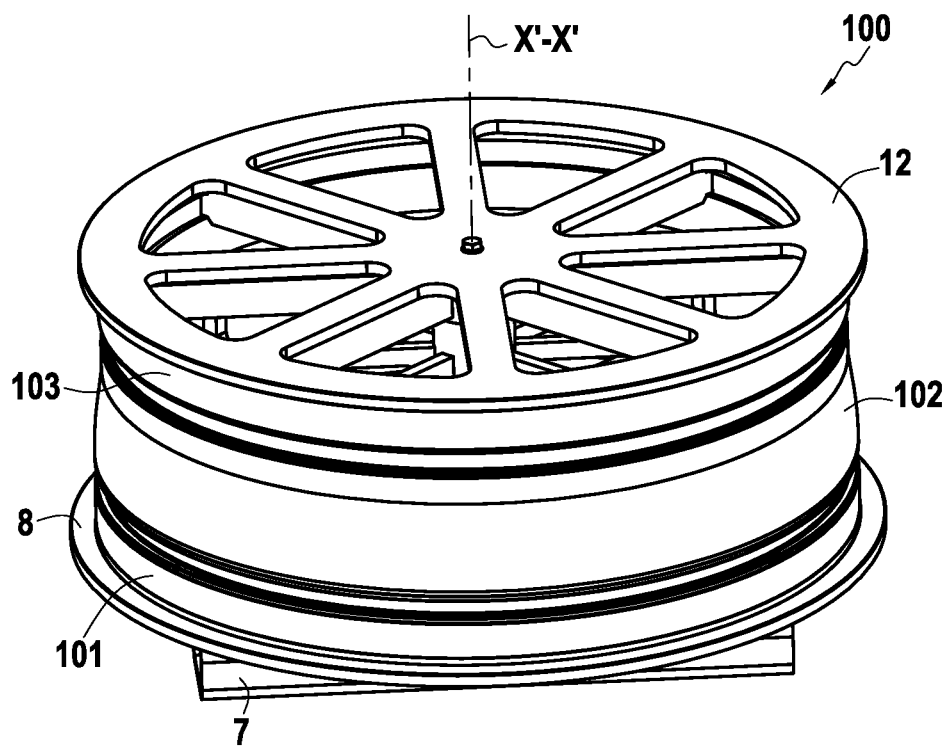
FIG. 3 is a perspective view of the FIG. 2 shaping tooling in an embodiment.
Figure 2:
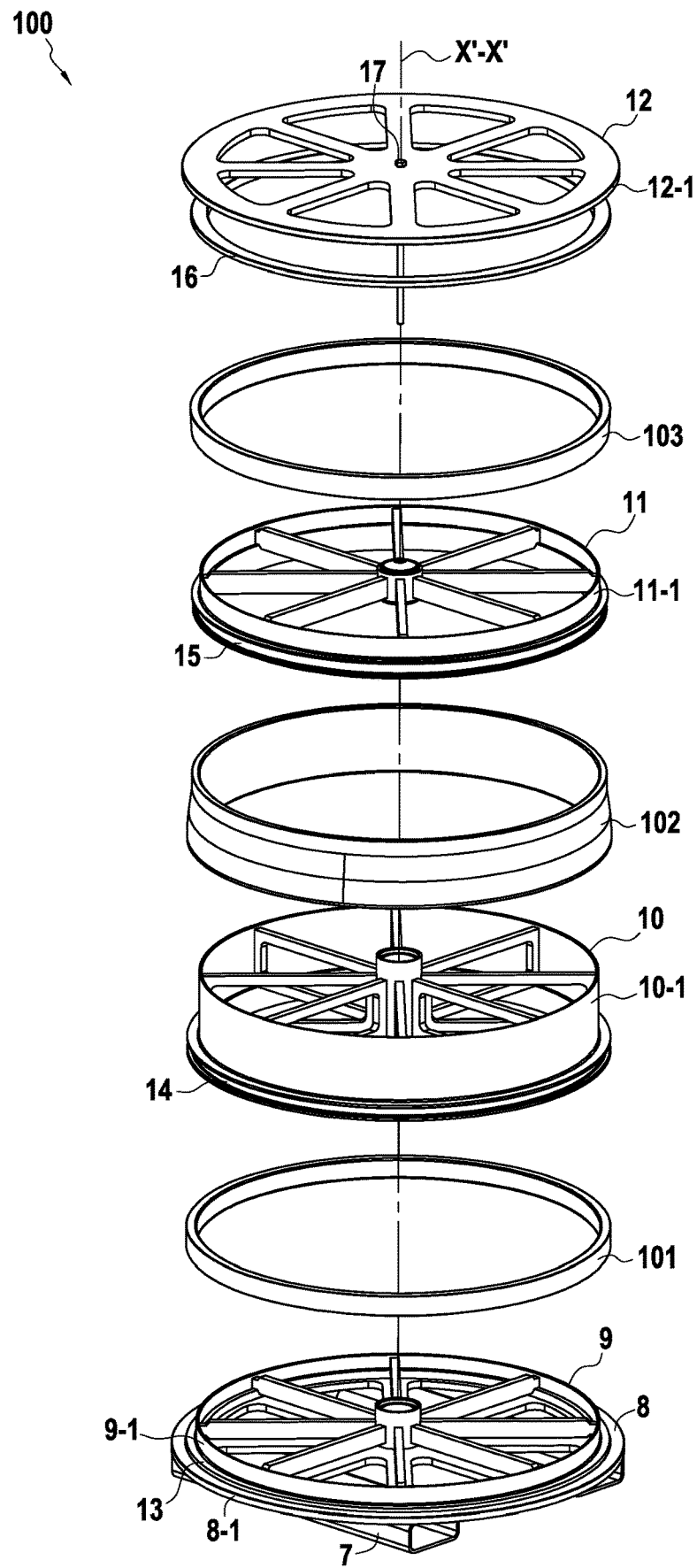
FIG. 2 is an exploded view of shaping tooling for a fan casing in an embodiment.

FIGS. 2 and 3 show respectively an exploded view of the tooling 100, and the tooling 100 on its own, i.e. without the casing 1. The tooling 100 presents a main direction extending axially along an axis X'-X' and it comprises a set of annular parts centered around that axis.

By way of example, in FIGS. 2 and 3, the shaping tooling 100 comprises in particular from upstream to downstream, where the downstream position is defined relative to a support 7 for the tooling 100, such as feet:

- a downstream rim 8 formed by an annular plate 8-1 and a set of spokes (eight in this example) extending between a central hub and the annular plate 8-1, the hub being centered on the axis X'-X'. The downstream rim 8 is arranged on the support 7 and presents as a radius greater than the radius of the outside surfaces of the flanges 5 and 6 of the casing 1 so as to be able to hold a downstream end of the casing 1 when it is placed around the tooling 100;
- a second rim 9 formed by an annular plate 9-1 and a set of spokes (eight in this example) extending between a central hub and the annular plate 9-1, the hub being centered on the axis X'-X'. The second rim 9 is arranged upstream relative from the downstream rim 8 and presents a radius smaller than the radius of the inner surfaces 35-1, 36-1 of the lateral zones 35, 36 of the band 2 of the casing 1 so as to be able to receive a downstream bladder 101 on the outside surface of the annular plate 9-1, which bladder is placed facing an inside surface 36-1 of the lateral zone 36, from which the downstream flange 6 of the casing 1 extends;
- a third rim 10 formed by an annular plate 10-1 and a set of spokes (eight in this example) extending between a central hub and the annular plate 10-1, the hub being centered on the axis X'-X'. The third rim 10 is arranged upstream relative to the second rim 9 and presents a radius smaller than the radius of the inside surface 4 of the retention zone of the casing 1 so as to be capable of receiving a central bladder 102 on the outside surface of the annular plate 10-1, which bladder is placed facing the inside surface 4 of the retention zone;
- a fourth rim 11 formed by an annular plate 11-1 and a set of spokes (eight in this example) extending between a central hub and the annular plate 11-1, the hub being centered on the axis X'-X'. The fourth rim 11 is arranged upstream relative to the third rim 10 and presents a radius smaller than the radius of the inside surfaces 35-1, 36-1 of the lateral zones 35, 36 of the band 2 of the casing 1 so as to be capable of receiving an upstream bladder 103 on the annular plate 11-1, which bladder is arranged facing an inside surface 35-1 of the lateral zone 35 from which the upstream flange 5 of the casing 1 extends; and
- an upstream rim 12 formed by an annular plate 12-1 and a set of spokes (eight in this example) extending between a central hub and the annular plate 12-1, the hub being centered on the axis X'-X'. The upstream rim 12 presents a radius greater than the radiuses of the outside surfaces of the flanges 5, 6 of the casing 1 so as to be capable of holding an upstream end of the casing 1 when it is put into place around the tooling 100.

Furthermore, annular plates 13, 14, 15, and 16 that are centered on the axis X-X' may be interposed between the various above-described rims, as in the example shown:

- an annular plate 13 is interposed between the downstream rim 8 and the second rim 9, thereby spacing them apart. The plate 13 serves to provide a downstream support to an axial end of the downstream bladder 101, thereby ensuring that it is held between the plates 13, 9-1, and 14;
- an annular plate 14 is interposed between the second rim 9 and the third rim 10, thereby spacing them apart. The plate 14 serves to provide an upstream support at an axial end of the downstream bladder 101, thereby holding it between the plates 14, 9-1, and 13. The plate 14 also serves to provide a downstream support to an axial end of the central bladder 102, thereby holding it between the plates 14, 10-1, and 15;
- an annular plate 15 is interposed between the third rim 10 and the fourth rim 11, thereby spacing them apart. The plate 15 serves to provide an upstream support to an axial end of the central bladder 102, thereby holding it between the plates 15, 10-1, and 14. The plate 15 also serves to provide a downstream support for an axial end of the upstream bladder 103, thereby holding it between the plates 15, 11-1, and 16; and
- an annular plate 16 is interposed between the fourth rim 11 and the upstream rim 12, thereby spacing them apart. The plate 16 also serves to provide upstream support for an axial end of the upstream bladder 103, thereby holding it between the plates 16, 11-1, and 15.

The annular plates 13, 14, 15, and 16 thus contribute in particular to supporting the bladders 101, 102, and 103, and also to spacing them apart. Thus, on either side of each bladder 101, 102, and 103, the plates 13, 14, 15, and 16 present outside surfaces contributing to form outside surface portions of the tooling 100. Once the casing 1 is put into place around the tooling 100, the inside surface of the casing 1 thus bears in particular against the bladders 101, 102, and 103, and also against the plates 13, 14, 15, and 16.

In the absence of the casing 1, assembling the tooling 100 consists in practice in assembling sequentially, from downstream to upstream, all of the parts shown in FIG. 2, and then locking them together using the fastener 17 passing through each of the parts along the axis X'-X'. By way of example in this figure, the fastener 17 comprises a bolt passing through all of the parts of the tooling 100 from upstream to downstream.

Thus, the assembled rims 9, 10, and 11 and annular plates 13, 14, 15, and 16 of the tooling 100 serve to form a drum presenting a surface of revolution about the axis X'-X'.

Figure 4:
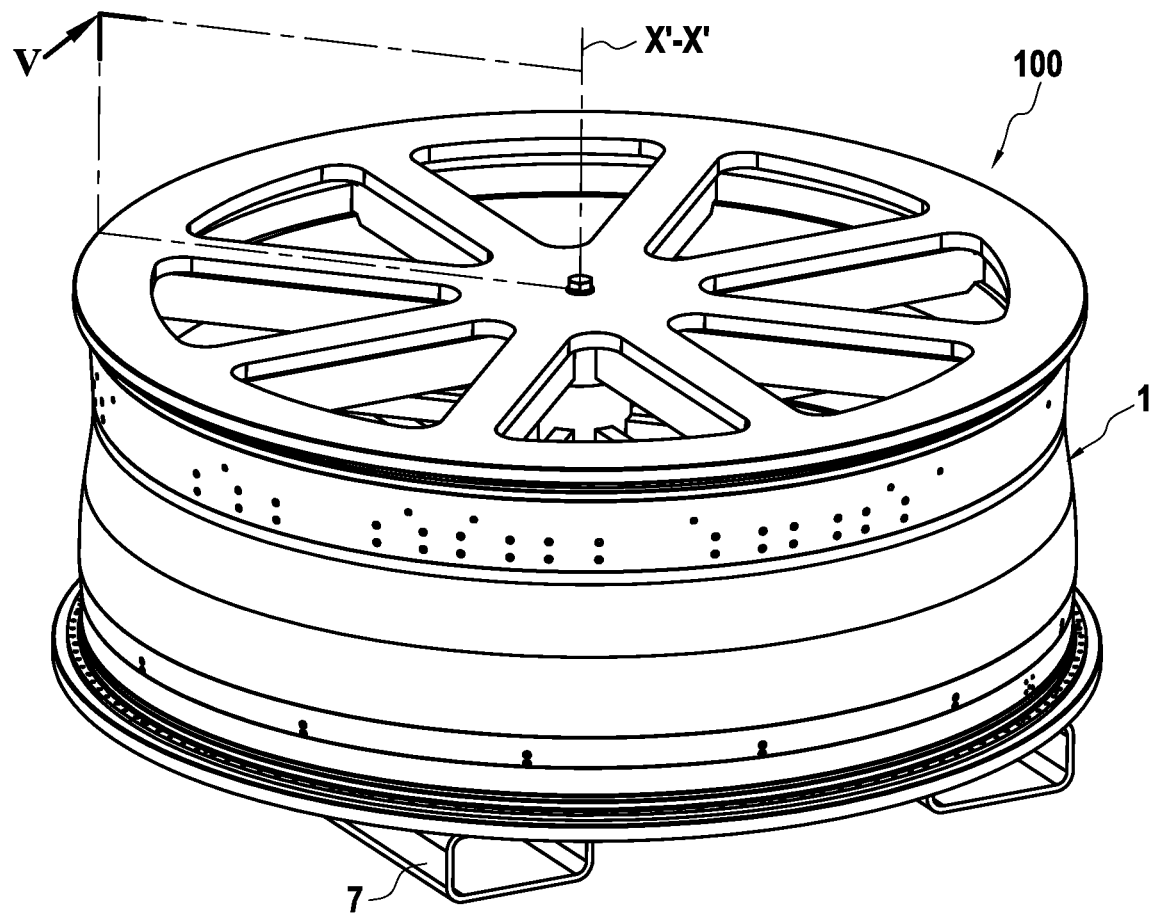
FIG. 4 is a perspective view of a fan casing placed around the FIG. 3 shaping tooling in an embodiment.

The fan casing 1 can be put into place facing the surface of revolution of the drum, as can be seen in FIG. 4. To do this, the fan casing 1 is put into place around the tooling 100 after assembling the upstream bladder 103 and before assembling the annular plate 16 between the upstream rim 12 and the fourth rim 11.

Thus, after putting the casing 1 into place around the drum of the tooling 100, part of the inside surface of the fan casing 1 faces the downstream central and upstream bladders 101, 102, and 103, and the annular plates 13, 14, 15, and 16.

Figure 5:
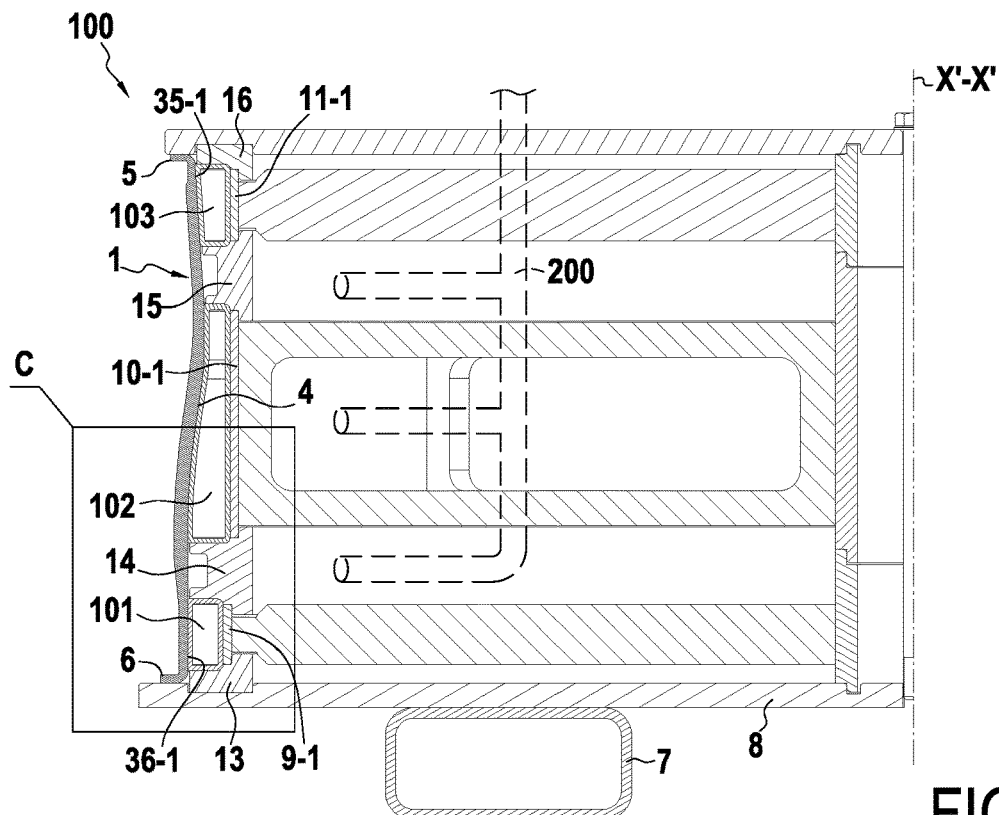
FIG. 5 is a half-view in radial section of the FIG. 4 shaping tooling on plane V.
Figure 6:
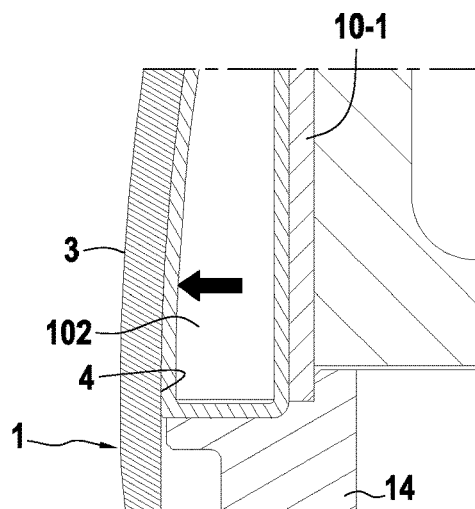
FIG. 6 is an enlargement of a boxed zone C in FIG. 5.

The bladders 101, 102, and 103 are bladders that are inflatable using a fluid under pressure, e.g. air, with each bladder being connected to an adjustment system 200 for adjusting a fluid under pressure and as shown in FIG. 5. The adjustment system 200 enables isostatic pressure to be applied via the bladders 101, 102, and 103, and thus to use the fluid under pressure to control the inflation of the bladders 101, 102, and 103. The bladders 101, 102, and 103 are interposed between the casing 1 and the drum of the tooling 100. The bladders 101, 102, and 103 can thus exert pressure on the inside surface of the casing 1 when it is put into place around the tooling 100. The application of pressure against the casing 1 is represented by unnumbered arrows in FIG. 6, which is an enlargement of the zone C in FIG. 5.

The arrangement and the number of bladders shown on the shaping tooling 100 in this example are given by way of illustration, it being possible to use a greater or smaller number of bladders for the tooling 100. The number of bladders may vary, but it nevertheless remains important to place these bladders facing zones that require a cylindrical profile. In this example, these zones comprise the lateral zones 35, 36 from which the flanges 5, 6 extend so as to guarantee that they can be properly fastened to parts upstream and downstream, and the intermediate zone 3 that forms a retention zone, since the inside surface 4 of this zone faces the rotor of the turbine engine.

In general manner, the shaping tooling 100 comprises at least one bladder 101, 102, and 103 extending over part or all of the surface of revolution of its drum, i.e. extending over a predetermined zone of the surface of revolution of the drum of the tooling 100 about the axis X'-X' and in a radial direction perpendicular to the axis.

In the example shown, three bladders 101, 102, and 103 extend radially over the entire circumference of the drum of the tooling 100 and extend axially over part of the surface of revolution of the drum. In other examples that are not shown, a plurality of bladders may extend radially so as to cover jointly part or all of the circumference of the surface of revolution of the drum of the tooling, or a bladder may cover only a portion of the circumference of that surface while covering all of the axial direction of that surface.

Beneficially, the shaping tooling 100 may serve to confer a cylindrical profile to predetermined zones of the inside surface of the fan casing 1. By way of example in FIGS. 1 to 6, the tooling 100 may serve to confer a cylindrical profile to the inside surfaces 35-1, 36-1 of the lateral zones 35, 36 from which the flanges 5, 6 extend, and to the inside surface 4 of the retention zone of the casing 1. Predetermined zones of the casing 1 are selected by positioning the bladders 101, 102, and 103 on the shaping tooling 100. Thus, in the example shown in FIGS. 1 to 6, when the fan casing 1 is put into place around the surface of revolution of the drum of the tooling 100:

the downstream bladder 101 is placed against the outside surface of the second rim 9 so as to face the inside surface 36-1 of the lateral zone 36 of the band 2;
the central bladder 102 is placed against the outside surface of the third rim 10 so as to face the inside surface 4 of the retention zone of the casing 1; and
the upstream bladder 103 is placed against the outside surface of the fourth rim 11 so as to face the inside surface 35-1 of the lateral zone 35 of the band 2.

The shaping tooling 100 may be used for various cycles in the life of the fan casing 1, e.g. while it is being fabricated or while it is being repaired in order to correct unwanted ovalization of predetermined zones of the casing 1, and so as to impart a cylindrical profile to those zones.

The casing 1 is shaped by putting the casing into place around the surface of revolution of the drum of the tooling 100 and then putting the tooling 100 into a stove. During the stoving step, the casing 1 in place on the tooling 100 is heated to a predetermined temperature, which temperature is lower than the glass transition temperature of the casing 1. By way of example, the casing is put into a stove for 4 hours at a temperature lying in the range 140° C. to 145° C. It thus becomes possible to use the tooling 100 to apply pressure against the inside surface of the casing 1 so as to deform it. It should be understood that the material(s) selected for making the tooling 100, and in particular the bladders, is/are not subject to deformation on being heated to the predetermined temperature of the stove. By way of example, the rims and the annular plates of the tooling may be made of metal (e.g.: steel, aluminum), of resin, or more generally of any material that is not subject to modification when the stove heats the casing 1 and the tooling 100 to the predetermined temperature.

While the casing 1 is being stoved, isostatic pressure is applied via at least one bladder 101, 102, or 103. The bladder 101, 102, or 103 then exerts pressure on a portion of the inside surface of the casing 1 facing that bladder, thereby deforming the surface of the casing 1 so as to impart a cylindrical profile thereto. This pressure is maintained subsequently at least until the casing 1 has cooled. Once the casing has cooled, the inside surface of the casing 1 facing the bladder 101, 102, or 103 then presents a profile that is substantially cylindrical.

As described above, the isostatic pressure is controlled by the adjustment system 200 for adjusting a fluid under pressure, which system is connected to the various bladders 101, 102, and 103 and serve to adjust the pressure applied via each of these various bladders. This adjustment system 200 may be directly integrated in the shaping tooling 100, or it may be integrated in the stove.

Benefit is thus taken of the step of stoving the casing 1 to correct the various zones thereof that present undesired ovalization. Such a stoving step can be envisaged at various stages in the life cycle of the casing 1, by way of example:

during fabrication of the casing 1. By way of example, benefit is used of a step of adhesively bonding an external element (e.g. an acoustic panel, a protection panel) that requires the casing 1 to be put into a stove for the purpose of simultaneously correcting ovalization of predetermined zones of the casing 1. The shaping of the casing 1 during this step is particularly beneficial since it makes it possible simultaneously to correct various accumulated ovalizations of the casing 1 that result from successive steps of machining it (unmolding the molded part, drilling, previously performed adhesive-bonding operations) while minimizing the duration of the process of fabricating the casing 1. In another example, the casing 1 may be stoved in an independent step, e.g. as a last step in the fabrication of the casing 1; and during a step repairing the casing 1. For example, benefit is taken of a repair step requiring an external panel to be adhesively bonded onto the casing 1 with a period of stoving in order to correct ovalization of predetermined zones of the casing 1 during this step. Once more, the shaping of the casing 1 during this step is found to be particularly beneficial since it makes it possible simultaneously to repair and to correct possible ovalization of the casing 1 resulting from use of the casing. In another example, the casing 1 may be stoved in an independent repair step, for the sole purpose of correcting ovalization of one or more predetermined zones of the inside surface of the casing 1.

The invention claimed is:

1. A method of shaping the profile of a fan casing having an inside surface, the method comprising:
placing the inside surface of the fan casing around a surface of revolution of a drum of shaping tooling;
interposing a plurality of bladders that are inflatable under the action of a fluid under pressure between the inside surface of the casing and the drum of the tooling, the bladders extending over all the surface of revolution of the drum;
stoving the assembly comprising the casing, the tooling, and said plurality of bladders at a predetermined temperature; and during the stoving, applying isostatic pressure via said plurality of bladders so as to impart a cylindrical profile to the inside surface of the casing facing said plurality of bladders and thus to counter ovalization of the casing.

2. The method according to claim 1, wherein the casing comprises a band extending axially between two flanges, the band having an intermediate zone situated at a distance from the flanges and two lateral zones on either side of the intermediate zone, the flanges extending radially from the lateral zones, the intermediate zone forming a retention zone of the casing, the isostatic pressure being applied in a bladder placed facing an inside surface of the retention zone and two bladders arranged facing inside surfaces of the two lateral zones of the band.

3. The method according to claim 2, wherein the isostatic pressure is maintained at least until the casing has cooled.

4. The method according to claim 1, wherein the stoving step corresponds to a step of adhesively bonding an external element onto the fan casing.

5. The method according to claim 1, wherein the stoving step is performed while repairing the fan casing.

6. A tooling for shaping the profile of a fan casing having an inside surface, the tooling comprising a drum presenting a surface of revolution and a plurality of bladders that are inflatable under the action of a fluid under pressure and extending over all the surface of revolution of the drum, the bladders being arranged so as to face the inside surface of the fan casing when they are put into place around the surface of revolution, said plurality of bladders being connected to an adjustment system configured to adjust a fluid under pressure and configured to use the fluid under pressure to control the inflation of the bladders so as to impart a cylindrical profile to the inside surface of the fan casing when it is in place around the surface of revolution and thus to counter ovalization of the casing.

7. The tooling according to claim 6, wherein the drum comprises a first rim, a second rim, and a third rim arranged between the first and second rims, and wherein said plurality of bladders are arranged on an outside surface of the first second and third rims so as to face respectively an inside surface of a first lateral zone, a second lateral zone and a retention zone of the casing when the casing is in place around the surface of revolution.

8. The tooling according to claim 6, wherein the adjustment system configured to adjust a fluid under pressure is integrated in the tooling.

9. A stove including shaping tooling according to claim 6.

10. The stove according to claim 9, wherein the adjustment system configured to adjust a fluid under pressure is integrated in the stove.

* * * * *